United States Patent
Paul et al.

(10) Patent No.: US 10,873,227 B2
(45) Date of Patent: Dec. 22, 2020

(54) INTERIOR PERMANENT MAGNET SYNCHRONOUS MACHINE

(71) Applicant: STEERING SOLUTIONS IP HOLDING CORPORATION, Saginaw, MI (US)

(72) Inventors: Subhra Paul, Saginaw, MI (US); Alejandro J. Pina Ortega, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 225 days.

(21) Appl. No.: 15/827,307

(22) Filed: Nov. 30, 2017

(65) Prior Publication Data
US 2019/0165628 A1 May 30, 2019

(51) Int. Cl.
| | | |
|---|---|---|
| *H02K 1/27* | (2006.01) | |
| *H02K 29/03* | (2006.01) | |
| *H02K 15/03* | (2006.01) | |
| *H02K 21/02* | (2006.01) | |
| *H02K 1/16* | (2006.01) | |
| *H02K 21/16* | (2006.01) | |

(52) U.S. Cl.
CPC ............ *H02K 1/2793* (2013.01); *H02K 1/16* (2013.01); *H02K 1/2766* (2013.01); *H02K 1/2773* (2013.01); *H02K 15/03* (2013.01); *H02K 21/024* (2013.01); *H02K 21/16* (2013.01); *H02K 29/03* (2013.01); *H02K 2213/03* (2013.01)

(58) Field of Classification Search
CPC ........ H02K 15/03; H02K 1/16; H02K 1/2773; H02K 1/2793; H02K 21/024; H02K 29/03; H02K 21/16; H02K 2213/03
USPC .......... 310/156.53, 156.25, 156.47
See application file for complete search history.

(56) References Cited

U.S. PATENT DOCUMENTS

| | | | | |
|---|---|---|---|---|
| 6,771,000 | B2 * | 8/2004 | Kim ..................... | F01D 15/10 310/156.16 |
| 7,518,277 | B2 * | 4/2009 | Nemoto ................ | H02K 29/03 310/156.45 |
| 8,786,156 | B2 * | 7/2014 | Hino ..................... | H02K 1/276 310/156.53 |
| 8,884,485 | B2 * | 11/2014 | Jurkovic .............. | H02K 1/2766 310/156.47 |
| 2005/0121990 | A1 * | 6/2005 | Kaneko ................. | H02K 1/276 310/156.47 |

(Continued)

FOREIGN PATENT DOCUMENTS

JP 63140645 A * 6/1988

*Primary Examiner* — Alex W Mok
(74) *Attorney, Agent, or Firm* — Dickinson Wright PLLC

(57) ABSTRACT

An interior permanent magnet synchronous machine includes a stator having electromagnetic windings and a rotor that is disposed concentric with the stator. The rotor has a plurality of rotor segments that include a first rotor segment and a second rotor segment. The first rotor segment is arranged to receive a first magnet set having first magnets that are disposed at a first pole-arc angle relative to each other. The second rotor segment is axially stacked relative to the first rotor segment along a rotor axis. The second rotor segment is arranged to receive a second magnet set having second magnets that are disposed at a second pole-arc angle relative to each other. The second pole-arc angle is different than the first pole-arc angle.

17 Claims, 2 Drawing Sheets

(56) References Cited

U.S. PATENT DOCUMENTS

| | | | |
|---|---|---|---|
| 2011/0309706 A1* | 12/2011 | Takahashi | H02K 1/2766 |
| | | | 310/156.53 |
| 2013/0169097 A1* | 7/2013 | Saban | H02K 21/14 |
| | | | 310/156.08 |
| 2013/0342043 A1 | 12/2013 | Liang et al. | |
| 2014/0035420 A1* | 2/2014 | Li | H02K 1/274 |
| | | | 310/156.47 |
| 2016/0380492 A1* | 12/2016 | Kawasaki | H02K 1/2766 |
| | | | 310/156.11 |
| 2017/0063188 A1* | 3/2017 | Lipo | H02K 1/2766 |
| 2017/0093237 A1* | 3/2017 | Tsuda | H02K 21/14 |
| 2017/0201138 A1* | 7/2017 | Leonardi | H02K 1/276 |
| 2017/0229933 A1* | 8/2017 | Leonardi | H02K 21/14 |

* cited by examiner

INTERIOR PERMANENT MAGNET SYNCHRONOUS MACHINE

BACKGROUND

The present disclosure relates to an interior permanent magnet synchronous machine having multiple rotor segments that are axially stacked relative to each other.

An interior permanent magnet machine typically includes a stator having stator coil windings and a rotor having permanent magnets that cooperate with stator poles that are defined by the stator coil windings. The stator coil windings may be energized by an electrical current to provide rotor torque, when the machine is acting as a motor. The interaction of an electromagnetic flux flow path created by the stator coil windings with a flux flow path created by the permanent magnets may be accompanied by harmonic waveform components that may induce motor torque fluctuations. These motor torque fluctuations may be manifested by torque ripple, torque oscillation, increased cogging torque, or back EMF harmonics.

Accordingly, it is desirable to reduce the motor torque fluctuations.

SUMMARY

According to an embodiment of the present disclosure, an interior permanent magnet synchronous machine is provided. The interior permanent magnet synchronous machine includes a stator having electromagnetic windings and a rotor that is disposed concentric with the stator. The rotor has a plurality of rotor segments that include a first rotor segment and a second rotor segment. The first rotor segment is arranged to receive a first magnet set having first magnets that are disposed at a first pole-arc angle relative to each other. The second rotor segment is axially stacked relative to the first rotor segment along a rotor axis. The second rotor segment is arranged to receive a second magnet set having second magnets that are disposed at a second pole-arc angle relative to each other. The second pole-arc angle is different than the first pole-arc angle.

In addition to one or more of the features described herein, the first rotor segment is disposed axially symmetric with respect to the second rotor segment such that the first magnet set at least partially covers the second magnet set.

According to another embodiment of the present disclosure, a rotor for an interior permanent magnet synchronous machine is provided. The rotor includes a plurality of rotor segments that are axially stacked along a rotor axis. The plurality of rotor segments include a first rotor segment and a second rotor segment. The first rotor segment is arranged to receive a first magnet set having first magnets that are disposed within a first magnet pocket. The first magnets have a first magnet length that extends perpendicular to the rotor axis. The second rotor segment is axially stacked relative to the first rotor segment along the rotor axis. The second rotor segment is arranged to receive a second magnet set having second magnets that are disposed within a second magnet pocket. The second magnets have a second magnet length that extends perpendicular to the rotor axis and is different than the first magnet length.

These and other advantages and features will become more apparent from the following description taken in conjunction with the drawings.

BRIEF DESCRIPTION OF THE DRAWINGS

The subject matter of the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Referring now to the Figures, where the present disclosure will be described with reference to specific embodiments, without limiting the same, it is to be understood that the disclosed embodiments are merely illustrative of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
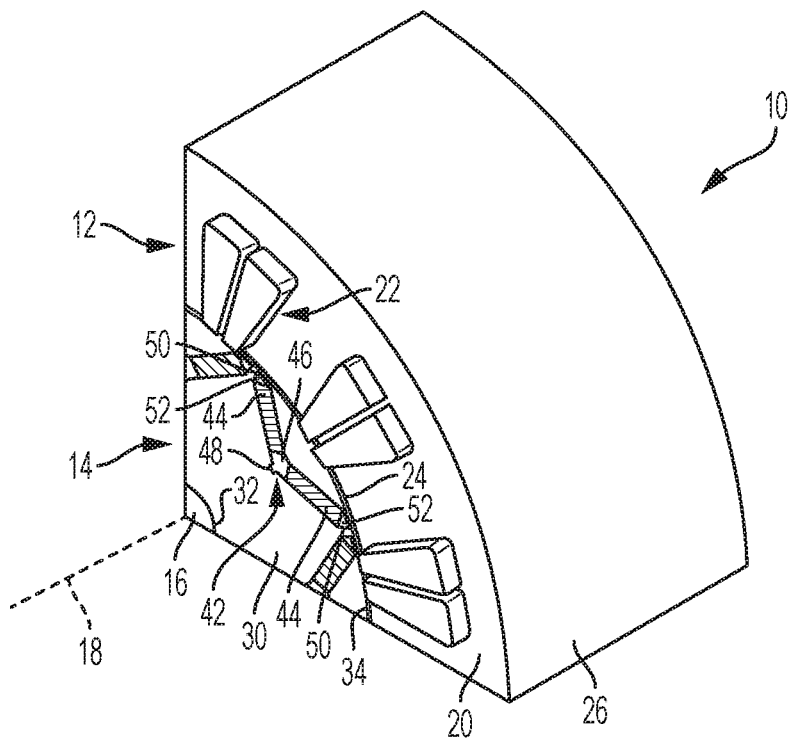
FIG. 1 is a perspective view of a portion of an interior permanent magnet synchronous machine.
Figure 2:
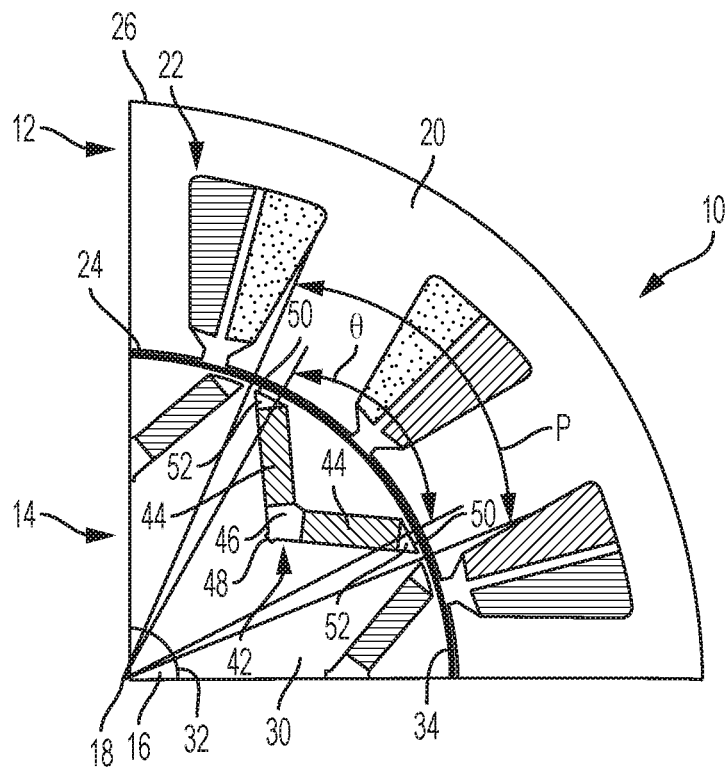
FIG. 2 is a plan view of the portion of the interior permanent magnet synchronous machine.

Referring to FIGS. 1 and 2, a portion of an interior permanent magnet synchronous machine 10 is illustrated. The portions of the interior permanent magnet synchronous machine 10 are radial slices or segments of the interior permanent magnet synchronous machine 10 to illustrate features of the present disclosure.

The interior permanent magnet synchronous machine 10 may be used in an application requiring a compact and high torque density interior permanent magnet synchronous machine. The interior permanent magnet synchronous machine 10 includes a stator 12, a rotor 14 that is disposed concentric with the stator 12, and a rotor shaft 16 that extends along a rotor axis 18. The stator 12 and the rotor 14 are each disposed about and extend along the rotor axis 18.

The stator 12 includes a stator core 20 and electromagnetic windings 22. The plurality of electromagnetic windings 22 may be disposed proximate an inner stator periphery 24 and spaced apart from an outer stator periphery 26. The plurality of electromagnetic windings 22 may taper in a direction that extends from the outer stator periphery 26 towards the inner stator periphery 24 such that a width of each winding of the plurality of electromagnetic windings 22 decreases in a direction that extends from the outer stator periphery 26 towards the inner stator periphery 24.

The rotor 14 may be rotatably disposed within the stator 12 and may be disposed about the rotor shaft 16 such that the interior permanent magnet synchronous machine 10 is configured as an interior rotor motor. In at least one embodiment, the rotor 14 may be disposed about the stator 12 such that the interior permanent magnet synchronous machine 10 is configured as an exterior rotor motor.

The rotor 14 includes a rotor core 30 that is disposed on the rotor shaft 16. The rotor core 30 radially extends between an inner rotor periphery 32 and an outer rotor periphery 34. The inner rotor periphery 32 engages the rotor shaft 16. The outer rotor periphery 34 faces towards and is spaced apart from the inner stator periphery 24 by an air gap.

Figure 3:
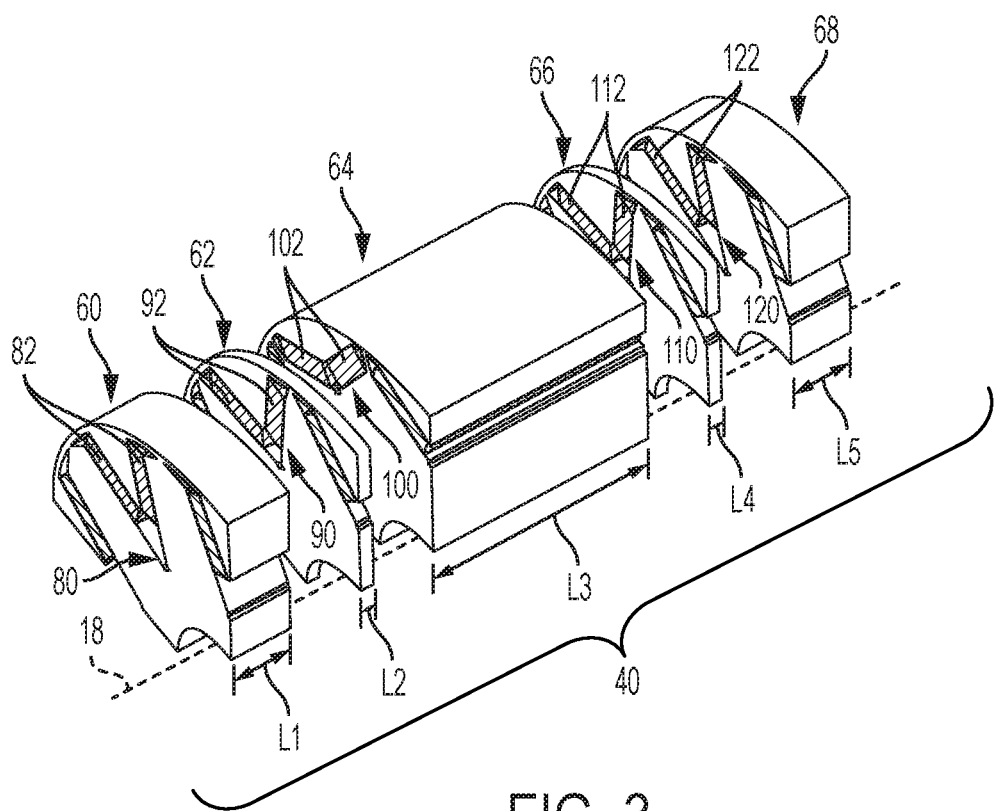
FIG. 3 is a disassembled view of a plurality of rotor segments of the interior permanent magnet synchronous machine.

The arrangement of the rotor core 30 of the rotor 14 may be of a flux focusing nature that provides higher torque density compared to other rotor configurations. This arrangement of the rotor 14 reduces cogging torque, back EMF harmonics, and torque ripple by providing a rotor core that comprises a plurality of rotor segments 40, as shown in FIG. 3, that are axially stacked relative to each other along the rotor axis 18 and varying at least one of pole arc angle of magnet pockets or magnets, axial length of rotor segments, magnet length, or magnet thickness between axially stacked rotor segments.

The plurality of rotor segments 40 are not skewed with respect to each other relative to the rotor axis 18. Each rotor segment of the plurality of rotor segments 40 defines a plurality of circumferentially spaced magnet slots or magnet pockets 42 that are disposed proximate the outer rotor periphery 34. Each magnet pocket of the plurality of magnet pockets 42 is arranged to receive a magnet set 44. As shown in the figures, the magnet set 44 includes two magnets that are spaced apart from each other by an air gap or nonmagnetic pocket 46 and are disposed at an angle relative to each other. The magnet set 44 may include sintered or injection molded magnets.

The nonmagnetic pocket 46 may define a notch 48 that extends towards the inner rotor periphery 32 of the rotor 14 and extends towards the rotor shaft 16. The two magnets of the magnet set 44 may be spaced apart from distal ends 50 of the magnet pocket of the plurality of magnet pockets 42 by another air gap or another nonmagnetic pocket 52.

Referring to FIG. 2, a pole pitch, p, may be defined as an angle that is equal 360°/number of poles. A v-angle or a pole arc angle, θ, may be defined between portions of each magnet of the magnet set 44 and measured from the rotor axis 18. The pole arc angle, θ, is such that each magnet pocket of the plurality of magnet pockets 42 are not disposed substantially parallel to each other or may have a general V-shape.

Referring to FIG. 3, the plurality of rotor segments 40 that define the rotor core 30 may include a first rotor segment 60, a second rotor segment 62, a third rotor segment 64, a fourth rotor segment 66, and a fifth rotor segment 68 are axially stacked along the rotor axis 18. Additional rotor segments may be axially stacked relative to the aforementioned rotor segments. As well, rotor segments of the aforementioned rotor segment may be omitted or combined with other rotor segments.

The first rotor segment 60 has a first rotor segment axial length, L1, relative to the rotor axis 18 that is measured between faces of the first rotor segment 60. The first rotor segment 60 defines a plurality of first magnet pockets 80 that extend substantially through the first rotor segment 60. The plurality of first magnet pockets 80 are circumferentially spaced apart about the first rotor segment 60. Each magnet pocket of the plurality of first magnet pockets 80 is arranged to receive a first magnet set 82.

Figure 4:
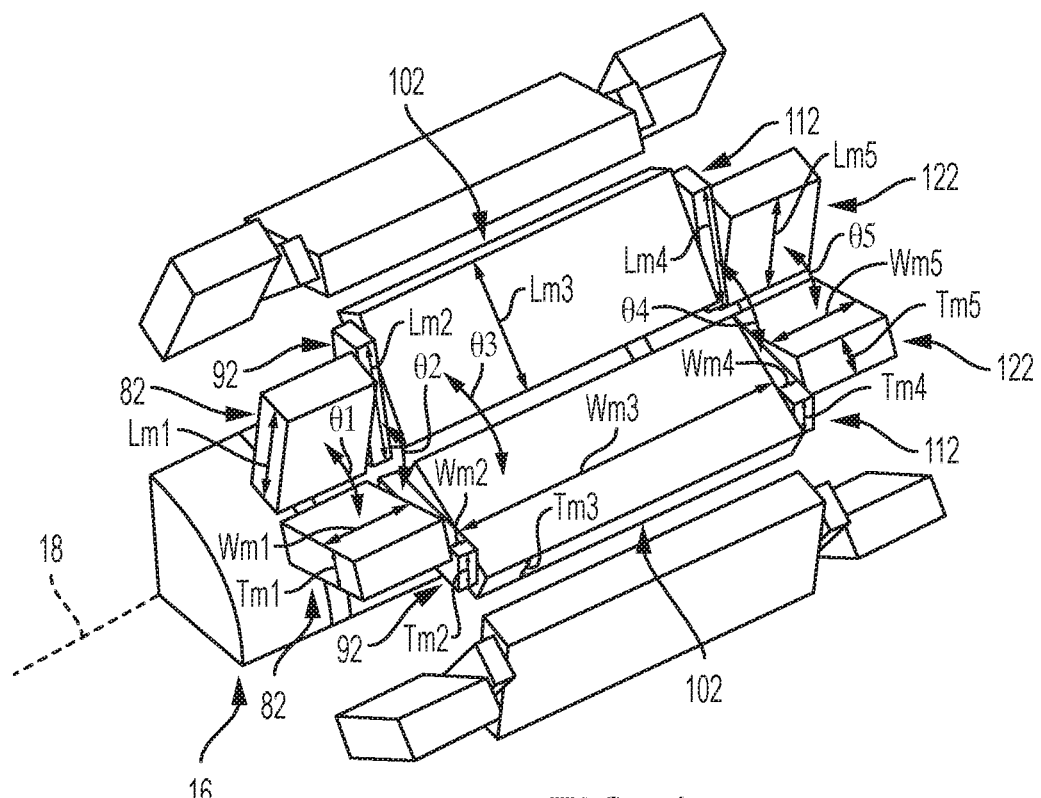
FIG. 4 is a partial disassembled view of the magnet sets and shaft of a rotor of the interior permanent magnet synchronous machine.

Referring to FIG. 4, the magnets of the first magnet set 82 are disposed at a first pole arc angle, θ1, relative to each other. The magnets of the first magnet set 82 of the first rotor segment 60 may all be disposed at the same first pole arc angle relative to each other.

The magnets of the first magnet set 82 may have a first magnet length, Lm1, which extends perpendicular to the rotor axis 18. The magnets of the first magnet set 82 may have a first magnet width, Wm1, which extends parallel to the rotor axis 18. The first magnet width, Wm1, is substantially equal to the first rotor segment axial length, L1. The magnets of the first magnet set 82 may have a first magnet thickness, Tm1, which extends circumferentially or tangentially across the first magnet pocket 80 or across the first magnets.

Referring to FIG. 3, the second rotor segment 62 is axially disposed between the first rotor segment 60 and the third rotor segment 64. The second rotor segment 62 has a second rotor segment axial length, L2, relative to the rotor axis 18 that is measured between faces of the second rotor segment 62. The second rotor segment axial length, L2, is different than the first rotor segment axial length, L1. In the embodiment shown, the second rotor segment axial length, L2, is less than the first rotor segment axial length, L1. In other embodiments, the second rotor segment axial length, L2, is greater than the first rotor segment axial length, L1.

The second rotor segment 62 defines a plurality of second magnet pockets 90 that extend substantially through the second rotor segment 62. The plurality of second magnet pockets 90 are circumferentially spaced apart about the second rotor segment 62.

Each magnet pocket of the plurality of second magnet pockets 90 is arranged to receive a second magnet set 92. The second rotor segment 62 is disposed axially symmetric with respect to the first rotor segment 60 such that the second magnet pocket 90 and the second magnet set 92 at least partially covers the first magnet pocket 80 and the first magnet set 82 but the second magnet pocket 90 and the second magnet set 92 are not skewed relative to the first magnet pocket 80 and the first magnet set 82.

Referring to FIG. 4, the magnets of the second magnet set 92 are disposed at a second pole arc angle, θ2, relative to each other. The second pole arc angle, θ2, is different than the first pole arc angle, θ1. The magnets of the second magnet set 92 of the second rotor segment 62 may all be disposed at the same second pole arc angle relative to each other.

The magnets of the second magnet set 92 may have a second magnet length, Lm2, which extends perpendicular to the rotor axis 18. The second magnet length, Lm2, is different than the first magnet length, Lm1.

The magnets of the second magnet set 92 may have a second magnet width, Wm2, which extends parallel to the rotor axis 18. The second magnet width, Wm2, is different than the first magnet width, Wm1. The second magnet width, Wm2, is substantially equal to the second rotor segment axial length, L2.

The magnets of the second magnet set 92 may have a second magnet thickness, Tm2, which extends circumferentially or tangentially across the second magnet pocket 90 or across the second magnets. The second magnet thickness, Tm2, is different than the first magnet thickness, Tm1.

Referring to FIG. 3, the third rotor segment 64 is axially disposed between the second rotor segment 62 and the fourth rotor segment 66. The third rotor segment 64 has a third rotor segment axial length, L3, relative to the rotor axis 18 that is measured between faces of the third rotor segment 64. The third rotor segment axial length, L3, is different than the second rotor segment axial length, L2.

The third rotor segment 64 defines a plurality of third magnet pockets 100 that extend substantially through the third rotor segment 64. The plurality of third magnet pockets 100 are circumferentially spaced apart about the third rotor segment 64.

Each magnet pocket of the plurality of third magnet pockets 100 is arranged to receive a third magnet set 102. The third rotor segment 64 is disposed axially symmetric with respect to the second rotor segment 62 such that the third magnet pocket 100 and the third magnet set 102 at least partially covers the second magnet pocket 90 and the second magnet set 92 but the third magnet pocket 100 and the third magnet set 102 are not skewed relative to the second magnet pocket 90 and the second magnet set 92.

Referring to FIG. 4, the magnets of the third magnet set 102 are disposed at a third pole arc angle, $\theta3$, relative to each other. The third pole arc angle, $\theta3$, is different than the first pole arc angle, $\theta1$, and the second pole arc angle, $\theta2$. The magnets of the third magnet set 102 of the third rotor segment 64 may all be disposed at the same third pole arc angle relative to each other.

The magnets of the third magnet set 102 may have a third magnet length, Lm3, which extends perpendicular to the rotor axis 18. The third magnet length, Lm3, is different than the second magnet length, Lm2.

The magnets of the third magnet set 102 may have a third magnet width, Wm3, which extends parallel to the rotor axis 18. The third magnet width, Wm3, is different than the second magnet width, Wm2. The third magnet width, Wm3, is substantially equal to the third rotor segment axial length, L3.

The magnets of the third magnet set 102 may have a third magnet thickness, Tm3, which extends circumferentially or tangentially across the third magnet pocket 100 or across the third magnets. The third magnet thickness, Tm3, is different than the second magnet thickness, Tm2.

Referring to FIG. 3, the fourth rotor segment 66 is axially disposed between the third rotor segment 64 and the fifth rotor segment 68. The fourth rotor segment 66 may have a substantially similar configuration as the second rotor segment 62. The fourth rotor segment 66 has a fourth rotor segment axial length, L4, relative to the rotor axis 18 that is measured between faces of the fourth rotor segment 66. The fourth rotor segment axial length, L4 is different than the third rotor segment axial length, L3, but may be equal to the second rotor segment axial length, L2.

The fourth rotor segment 66 defines a plurality of fourth magnet pockets 110 that extend substantially through the fourth rotor segment 66. The plurality of fourth magnet pockets 110 are circumferentially spaced apart about the fourth rotor segment 66.

Each magnet pocket of the plurality of fourth magnet pockets 110 is arranged to receive a fourth magnet set 112. The fourth rotor segment 66 is disposed axially symmetric with respect to the third rotor segment 64 such that the fourth magnet pocket 110 and the fourth magnet set 112 at least partially covers the third magnet pocket 100 and the third magnet set 102 but the fourth magnet pocket 110 and the fourth magnet set 112 are not skewed relative to the third magnet pocket 100 and the third magnet set 102.

Referring to FIG. 4, the magnets of the fourth magnet set 112 are disposed at a fourth pole arc angle, $\theta4$, relative to each other. The fourth pole arc angle, $\theta4$, is different than the third pole arc angle, $\theta3$, but may be equal to the second pole arc angle, $\theta2$. The magnets of the fourth magnet set 112 of the fourth rotor segment 66 may all be disposed at the same fourth pole arc angle relative to each other.

The magnets of the fourth magnet set 112 may have a fourth magnet length, Lm4, which extends perpendicular to the rotor axis 18. The fourth magnet length, Lm4, is different than the third magnet length, Lm3, but may be equal to the second magnet length, Lm2.

The magnets of the fourth magnet set 112 may have a fourth magnet width, Wm4, which extends parallel to the rotor axis 18. The fourth magnet width, Wm4, is different than the third magnet width, Wm3, but may be equal to the second magnet width, Wm2. The fourth magnet width, Wm4, is substantially equal to the fourth rotor segment axial length, L4.

The magnets of the fourth magnet set 112 may have a fourth magnet thickness, Tm4, which extends circumferentially or tangentially across the fourth magnet pocket 110 or across the fourth magnets. The fourth magnet thickness, Tm4, is different than the third magnet thickness, Tm3, but may be equal to the second magnet thickness, Tm2.

Referring to FIG. 3, the fifth rotor segment 68 is axially disposed aft of the fourth rotor segment 66. The fifth rotor segment 68 may have a substantially similar configuration as the first rotor segment 60. The fifth rotor segment 68 has a fifth rotor segment axial length, L5, relative to the rotor axis 18 that is measured between faces of the fifth rotor segment 68. The fifth rotor segment axial length, L5, is different than the fourth rotor segment axial length, L4, but may be equal to the first rotor segment axial length, L1.

The fifth rotor segment 68 defines a plurality of fifth magnet pockets 120 that extend substantially through the fifth rotor segment 68. The plurality of fifth magnet pockets 120 are circumferentially spaced apart about the fifth rotor segment 68.

Each magnet pocket of the plurality of fifth magnet pockets 120 is arranged to receive a fifth magnet set 122. The fifth rotor segment 68 is disposed axially symmetric with respect to the fourth rotor segment 66 such that the fifth magnet pocket 120 and the fifth magnet set 122 at least partially covers the fourth magnet pocket 110 and the fourth magnet set 112 but the fifth magnet pocket 120 and the fifth magnet set 122 are not skewed relative to the fourth magnet pocket 110 and the fourth magnet set 112.

Referring to FIG. 4, the magnets of the fifth magnet set 122 are disposed at a fifth pole arc angle, $\theta5$, relative to each other. The fifth pole arc angle, $\theta5$, is different than the fourth pole arc angle, $\theta4$, but may be equal to the first pole arc angle, $\theta1$. The magnets of the fifth magnet set 122 of the fifth rotor segment 68 may all be disposed at the same fifth pole arc angle relative to each other.

The magnets of the fifth magnet set 122 may have a fifth magnet length, Lm5, which extends perpendicular to the rotor axis 18. The fifth magnet length, Lm5, is different than the fourth magnet length, Lm4, but may be equal to the first magnet length, Lm1.

The magnets of the fifth magnet set 122 may have a fifth magnet width, Wm5, which extends parallel to the rotor axis 18. The fifth magnet width, Wm5, is different than the fourth magnet width, Wm4, but may be equal to the first magnet width, Wm1. The fifth magnet width, Wm5, is substantially equal to the fifth rotor segment axial length, L5.

The magnets of the fifth magnet set 122 may have a fifth magnet thickness, Tm5, which extends tangentially or circumferentially across the fifth magnet pocket 120 or across the fifth magnets. The fifth magnet thickness, Tm5, is different than the fourth magnet thickness, Tm4, but may be equal to the first magnet thickness, Tm1.

The pole arc angle may vary from one rotor segment to another of the plurality of rotor segments 40. In addition to varying pole arc angle between rotor segments of the plurality of rotor segments 40 rotor segment axial length or width as well as magnet length, or thickness may be varied from one rotor segment to another of the plurality of rotor segments 40. The variation of these parameters may reduce back EMF harmonics and cogging torque that leads to a reduction in torque ripple. For example, higher order EMF harmonics (e.g. $5^{th}$ order or greater) are especially improved due to the variation and optimization of at least one of the pole-arc angle, axial length of each rotor segment, magnet length, magnet width, or magnet thickness.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in scope with the present disclosure. Additionally, while various embodiments of the present disclosure have been described, it is to be understood that aspects of the present disclosure may include only some of the described embodiments or combinations of the various embodiments. Accordingly, the present disclosure is not to be seen as limited by the foregoing description.

Having thus described the present disclosure, it is claimed:

1. An interior permanent magnet synchronous machine, comprising:
    a stator having electromagnetic windings; and
    a rotor that is disposed concentric with the stator and is disposed about a rotor axis, the rotor having a plurality of rotor segments, comprising:
        a first rotor segment being arranged to receive a first magnet set having first magnets, arranged in a V-shape, that are disposed at a first pole-arc angle relative to each other, and
        a second rotor segment that is axially stacked relative to the first rotor segment along the rotor axis, the second rotor segment being arranged to receive a second magnet set having second magnets, arranged in a V-shape, that are disposed at a second pole-arc angle relative to each other, the second pole-arc angle being different than the first pole-arc angle, the second magnet set is not skewed relative to the first magnet set,
        each first magnet of the first magnet set being coaxial with each second magnet of the second magnet set, the each second magnet oriented at an oblique angle relative to the each first magnet.

2. The interior permanent magnet synchronous machine of claim 1, wherein the first rotor segment is disposed axially symmetric with respect to the second rotor segment such that the first magnet set at least partially covers the second magnet set.

3. The interior permanent magnet synchronous machine of claim 1, wherein the first rotor segment has a first rotor segment axial length.

4. The interior permanent magnet synchronous machine of claim 3, wherein the second rotor segment has a second rotor segment axial length.

5. The interior permanent magnet synchronous machine of claim 4, wherein the first rotor segment axial length is different from the second rotor segment axial length.

6. The interior permanent magnet synchronous machine of claim 5, wherein: the first magnets have a first magnet thickness that extends tangentially across the first magnets and the second magnets have a second magnet thickness that extends tangentially across the second magnets.

7. The interior permanent magnet synchronous machine of claim 6, wherein the first magnet thickness is different than the second magnet thickness.

8. The interior permanent magnet synchronous machine of claim 5, wherein the plurality of rotor segments has:
    a third rotor segment that is axially stacked relative to the first rotor segment and the second rotor segment along the rotor axis, the third rotor segment having a third rotor segment axial length that is different than the first rotor segment axial length and the second rotor segment axial length, the third rotor segment is arranged to receive a third magnet set having third magnets that are disposed at a third pole-arc angle relative to each other, the third pole-arc angle being different than the first pole-arc angle and the second pole-arc angle.

9. The interior permanent magnet synchronous machine of claim 8, wherein the rotor is disposed within the stator.

10. The interior permanent magnet synchronous machine of claim 8, wherein the rotor is disposed about the stator.

11. A rotor for an interior permanent magnet synchronous machine, comprising:
    a plurality of rotor segments that are axially stacked along a rotor axis, the plurality of rotor segments, having:
        a first rotor segment being arranged to receive a first magnet set having first magnets that are disposed within a first magnet pocket, the first magnets, arranged in a V-shape, are disposed at a first pole-arc angle relative to each other and have a first magnet length that extends perpendicular to the rotor axis, and
        a second rotor segment that is axially stacked relative to the first rotor segment along the rotor axis, the second rotor segment being arranged to receive a second magnet set having second magnets that are disposed within a second magnet pocket, the second magnets, arranged in a V-shape, are disposed at a second pole-arc angle relative to each other and have a second magnet length that extends perpendicular to the rotor axis and is different than the first magnet length, the second pole-arc angle is different than the first pole-arc angle and the second magnet set is not skewed relative to the first magnet set,
        each first magnet of the first magnet set being coaxial with each second magnet of the second magnet set, the each second magnet oriented at an oblique angle relative to the each first magnet.

12. The rotor of claim 11, wherein the first magnets have a first magnet width that extends parallel to the rotor axis.

13. The rotor of claim 12, wherein the second magnets have a second magnet width that extends parallel to the rotor axis.

14. The rotor of claim 13, wherein the first magnet width is different than the second magnet width.

15. The rotor of claim 11, wherein the first magnets have a first magnet thickness that extends tangentially across the first magnet pocket.

16. The rotor of claim 15, wherein the second magnets have a second magnet thickness that extends tangentially across the second magnet pocket.

17. The rotor of claim 16, wherein the first magnet thickness is different than the second magnet thickness.

* * * * *